United States Patent [19]
Isham et al.

[11] 3,862,499
[45] Jan. 28, 1975

[54] WELL SURVEYING APPARATUS

[75] Inventors: Carroll E. Isham, Buena Park; Robert E. Elas, Carson, both of Calif.

[73] Assignee: Scientific Drilling Controls, Newport Beach, Calif.

[22] Filed: Feb. 12, 1973

[21] Appl. No.: 331,574

[52] U.S. Cl. .................................. 33/312, 33/302
[51] Int. Cl. ............................................. G01c 9/16
[58] Field of Search ............ 33/1 H, 303, 312, 301, 33/302, 304

[56] References Cited
UNITED STATES PATENTS
2,635,349  4/1953  Green ................................. 33/312
2,806,295  9/1957  Ball ..................................... 33/312
3,407,508  10/1968 Baskir ................................. 33/312
3,587,175  6/1971  Armistead ........................... 33/303
3,587,176  6/1971  Schnerb .............................. 33/312
3,771,118  11/1973 Lichte, Jr. et al. ................. 33/312

*Primary Examiner*—William D. Martin, Jr.
*Attorney, Agent, or Firm*—William P. Green

[57] ABSTRACT

Well surveying equipment including a probe which is lowerable into a well and contains inclination and direction sensing elements coacting with surface equipment which functions to perform a surveying computation and then produce a survey graph and/or a printed record of the survey information.

20 Claims, 7 Drawing Figures

WELL SURVEYING APPARATUS

BACKGROUND OF THE INVENTION

This invention relates to apparatus for performing a survey on a well, that is, for determining the extent and direction of departure of the well from a true vertical condition.

In performing a survey on a well by conventional methods, it is customary to lower into the well an instrument which contains an inclination responsive element and a compass element, together with a camera which photographs these two elements simultaneously at a particular location in the well, to produce a record of the amount and direction of drift from the vertical at that location. A number of such photographs taken at different levels can then be studied, and their information be utilized in calculating the final survey results.

This is obviously a very slow and inconvenient procedure, often involving a delay of several days between the time that the survey instrument is initially lowered into the well and the time that the photographs are developed and the survey calculations completed. In addition, the procedure in many instances produces an ultimate survey record which is less precise and accurate than would be desired.

SUMMARY OF THE INVENTION

The present invention provides apparatus which is capable of performing a well survey much more effectively and quickly than the above discussed conventional photographic type equipment. As will appear, the survey apparatus of the invention can function to automatically produce a full survey record instantaneously at the same time that the inclination and direction readings are being taken in the well, and can progressively update this information as successive readings are taken on a single run of the equipment into the well.

To achieve these results, the apparatus includes a probe which is lowerable into the well, desirably on a simple wireline, and which delivers inclination and direction signals to the surface of the earth while the probe remains in the well. These signals, in conjunction with a related signal dependent upon the depth of the probe in the well at a particular time, are then fed into a computer unit, which is programmed to perform a predetermined calculation resulting in the development of a record of the survey. More particularly, the probe and depth responsive unit may take readings at two or more successive locations or stations in the well, and the computer is then programmed to calculate the departure of the well, in at least one horizontal or vertical direction, between these two stations. Preferably, the computer calculates three different departure components, consisting of the North-South horizontal departure, East-West horizontal departure, and the true vertical departure between the two stations. A series of such departure computations may be performed by the computer between a series of successive stations in the well, with the incremental departures being summed in the computer to maintain a running total of the three departures.

The output of the computer may be employed to control an x-y plotter, which can then graphically represent the course which the well follows in the earth. Also, a printed record of the three departures, as well as the inclination of the well at each station, the azimuth or direction of that inclination, and any other desired information, can be provided for each of the various stations at which readings are taken by the probe.

The probe itself contains appropriate means for responding to the inclination of the well, desirably including three inclination sensors for responding to component inclinations in three mutually perpendicular directions. Also, the probe contains direction sensing means for determining the orientation of the probe with respect to a predetermined known direction, such as the North-South magnetic field of the earth, or true North. Where the magnetic North is used as a reference direction, the direction sensing means may include three magnetically sensitive elements, such as three mutually perpendicular fluxgates, producing directional components from which the computer may derive the actual directional orientation of the probe. In instances in which surveys are to be taken within a drill string or casing which would prevent the use of magnetically responsive sensing elements, it is contemplated that a gyro or gyros may be substituted for these magnetic units.

The sensing probe may be of a character similar to that disclosed in U.S. application Ser. No. 764,157 filed Oct. 1, 1968 by Michael King Russell on "Indicating Instruments."

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figures 1, 2, 3:
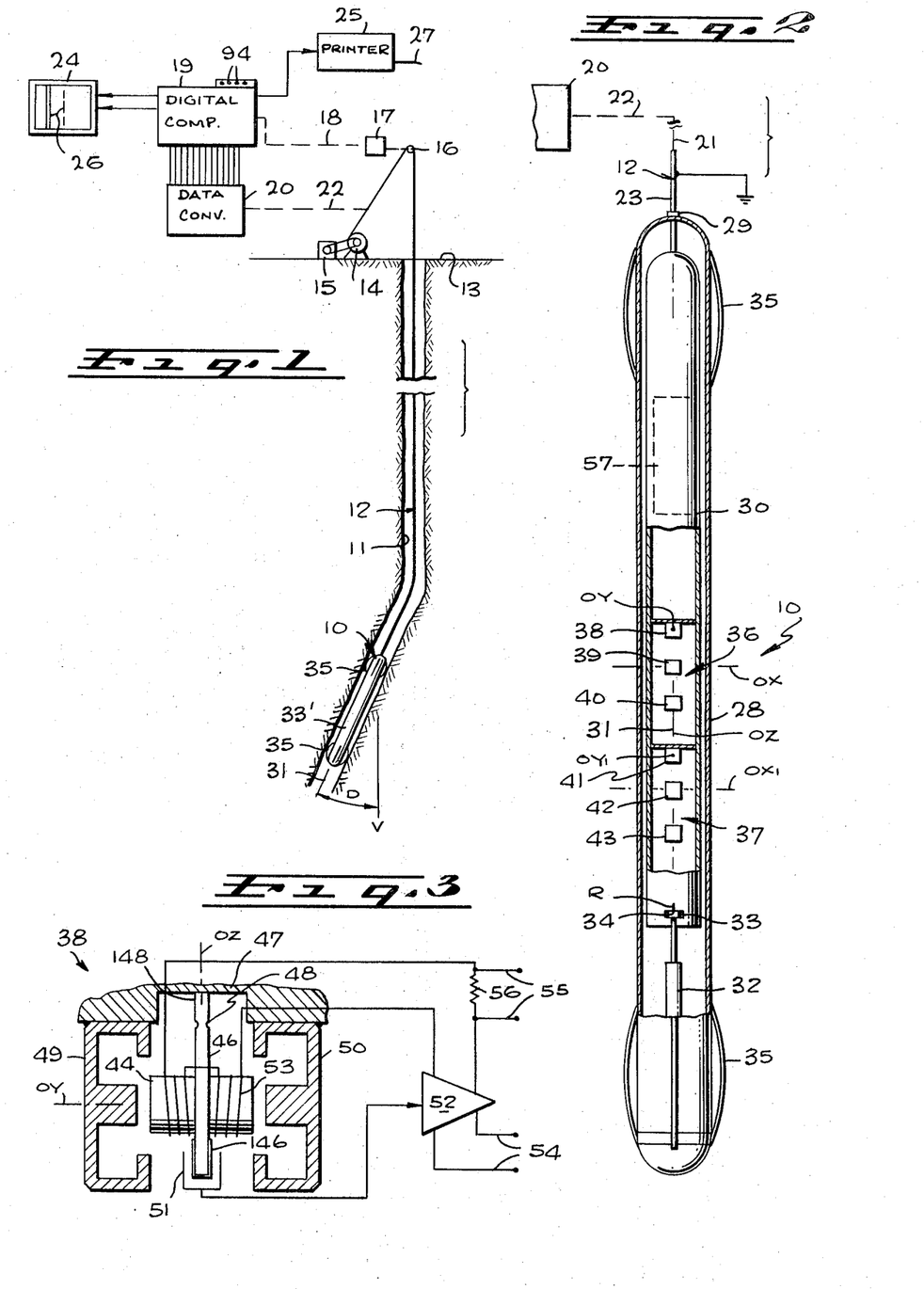
FIG. 1 is a somewhat diagrammatic representation of one form of surveying apparatus embodying the invention.
FIG. 2 is an enlarged vertical section through the sensing probe of the FIG. 1 apparatus.
FIG. 3 illustrates somewhat diagrammatically one of the inclination sensing accelerometers of the FIG. 2 probe.

The well surveying apparatus illustrated in FIG. 1 includes an elongated probe 10 which is lowered into the well 11 on a conventional flexible electrically conductive wireline 12. At the surface of the earth represented at 13, the wireline is wound about a drum 14 which is suitably power driven by a motor represented at 15 to raise and lower the probe in the well. At some location, the wireline passes about a pulley wheel or sheave represented at 16, which engages the wireline with sufficient friction to turn in exact correspondence with the upward and downward movement of the probe, and which correspondingly drives an odometer 17 producing electrical pulses in a line 18 at a rate corresponding to and directly representing and proportional to the upward and downward movements of the probe. These pulses or signals in line 18 are fed to a digital computer 19 at the surface of the earth, which is programmed to make certain later-to-be-discussed survey computations.

The wireline 12 conducts signals upwardly from probe 10 to the surface of the earth and to a data converter circuit 20. These signals may include representations of a number of different inclination and direction components or vectors, which may in some instances be conducted through a number of different mutually insulated wires in a multiple conductor cable functioning as the wireline, but which preferably are carried on a single core cable in multiplexed fashion. In the circuitry illustrated in FIG. 5, it is assumed that a multiplexing arrangement is employed, in order to minimize the cost of the wireline. In FIG. 2, the single central conductive core or wire of the wireline, typically formed of copper, is represented at 21, and is connected at its upper end through a line represented at 22 to the input side of data converter 20. About conductor 21 the wireline includes a concentric grounded electrically conductive outer sheath 23, insulated from the inner conductive core and acting to complete the second side of the circuit from the probe to the data converter.

Computer 19 may be a general purpose digital computer, and preferably has its output connected to an x-y plotter 24 and a printer 25, with the former functioning to produce in real time a graph 26 representing the departure of the well from true vertical. Printer 25 functions to produce a printed record in real time, typically on a paper tape 27, giving the various departures, inclinations, azimuths, and other types of survey information at a series of different stations in the well.

Referring now to FIG. 2, the probe 10 which is lowered into the well may include an outer vertically elongated hollow essentially tubular rigid case or housing 28 which is sealed against entrance thereinto of the pressurized well fluid, and is strong enough to withstand its pressure, and which is suspended from the upper end of the probe at 29 from wireline 12. An inner vertically elongated case or housing 30 is contained within outer case 28, and is mounted concentrically therein, centered about a main longitudinal axis 31. This inner housing contains the actual sensing equipment and associated electronic circuitry. To protect this apparatus against mechanical shocks, the inner housing may be connected to the outer housing by an appropriate shock absorbing structure, as represented at 32. This shock absorbing structure may be attached to housing 30 by means of a T-shaped connector 33, received and retained within a T-slot 34 extending transversely of axis 31 into a lower portion of housing 30. When the sensing elements within housing 30 are partially of a magnetic character, to respond to the earth's magnetic field, both of the cases 28 and 30 are made of non-magnetic material, such as a suitable aluminum alloy, to avoid interference with the desired magnetic response. In FIG. 1, it may be assumed that the well 11 is itself uncased, and does not contain a drill pipe or other string or pipe or tubing which might otherwise interfere with the magnetic response. If the probe is substantially smaller in diameter than the hole, appropriate centering or spacing springs 35 may be provided for maintaining the probe in an accurately centered and aligned position in the well during the lowering procedure.

Figure 6:
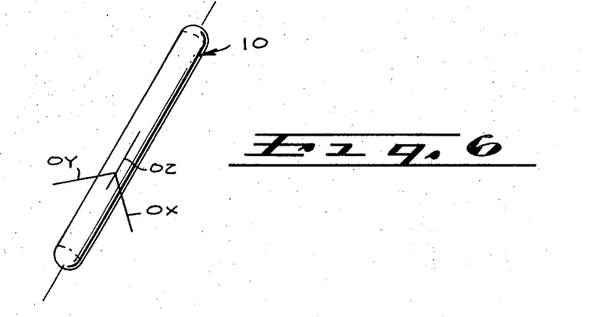
FIG. 6 represents diagrammatically and in perspective the three instrument fixed axes of the probe.

Probe 10 contains sensing means designated generally by the number 36 (FIG. 2), for responding to the inclination of the probe axis 31 with respect to the vertical. In addition, the probe contains second sensing means designated by the number 37, for sensing the relationship between the probe axis 31 and the earth's magnetic field. The inclination as determined by the first sensing means 36 may ultimately be read out by printer 25 as the 'drift angle' D (FIG. 1) between probe axis 31 and a true vertical line V. To attain an accurate indication of this drift angle in all positions of the probe, means 36 desirably include three separate inclination responsive units 38, 39 and 40, which have three different mutually perpendicular sensing axes OY, OX, and OZ (FIG. 6), and which sense drift angle components between their respective axes and the true vertical line V. More particularly, the unit 40 may have its axis OZ aligned with (coincident with) the longitudinal axis 31 of the probe, to extend directly vertically when the probe itself is in a true vertical position. Unit 40 then functions to produce or control an output signal, desirably a D.C. voltage signal, whose value is an analog representation, and preferably a trignometric function, of the angle D between axis OZ and the vertical in any particular position of the instrument. Similarly, unit 38 produces an output voltage or other signal which is an analog representation of the angularity between axis OY and the vertical, while unit 39 produces a corresponding analog signal representing the angle between axis OX and the vertical, both of these signals like the first signal preferably being trigonometric functions of the angles represented. As will be apparent, when axis OZ is in directly vertical position, the two axes OX and OY extend directly horizontally and perpendicular to one another. In a predetermined reference or zero position, OZ is vertical, OY extends horizontally in a North-South direction (magnetic North) and OX extends horizontally and in an East-West direction.

The direction sensing means 37 include three individual units 41, 42, and 43 for sensing three component angularities between three different mutually perpendicular axes respectively and the earth's magnetic field (magnetic North-South line). One of these units, say unit 43, may have the same axis OZ as inclination sensing unit 40 (coinciding with instrument axis 31), to produce an output signal which is an analog representation of the angularity between axis OZ and the earth's magnetic field. Unit 41 may have an axis $OY_1$ which is parallel to axis OY of inclination sensing unit 38, and which may be treated analytically as the same axis. Similarly unit 43 may have an axis $OX_1$ which is parallel to and can be treated analytically as coinciding with axis OX of unit 39. These three units 41, 42 and 43 produce output signals, preferably D.C. voltage signals, whose values constitute analog representation of (desirably trigonometric functions of) the angles between each of these axes OY, OX and OZ respectively and the earth's magnetic field in any particular position of the probe.

While it is contemplated that the three inclination sensing units 38, 39, and 40 may take any of various different forms, it is presently preferred that these sensing units be three identical accelerometers, desirably of the force balance type, each functioning to measure the acceleration of gravity along its particular instrument-fixed axis OY, OX, or OZ. FIG. 3 illustrates one known type of force balance accelerometer, specifically of the "Q-Flex" design, which may be utilized. In that Figure, the accelerometer 38 and its axis OY have been represented as typical of the three accelerometers and their relationship to their individual axes.

The accelerometer of FIG. 3 includes a proof mass 44 which is mounted between two permanent magnets 49 and 50 for movement along the sensing or critical axis OY of unit 38, and which is restrained against and not free for movement in any other direction. In FIG. 3, this confined single-axis mounting is effected by forming the proof mass at the center of and integral with a disc 46 centered about axis OY, with the periphery of the disc being connected at one side only to a rigid support 47 through a reduced neck 48 which is very thin in a direction parallel to axis OY but not in other directions, to thereby permit movement of disc 46 and mass 44 only in the desired direction along axis OY. Unit 44-46 and its neck 48 may be formed of an appropriately slightly resilient material, such as quartz, causing the unit 44-46 to resiliently return to the illustrated central position of FIG. 3, with a motion sensing element 51 being so located as to sense movements of unit 44-46 in either direction from the FIG. 3 normal centered position. Element 51 may be a capacitive type pickoff, coacting with a vapor deposited metallic film 146 formed on disc 46 to provide a pickoff signal which energizes a servo unit 52 to supply current to a coil 53, wound about and movable with the proof mass, from a power source 54 and at a controlled value just sufficient to coact with magnets 49 and 50 in always maintaining disc 46, mass 44, and coil 53 in the FIG. 3 normal centered position. That is, the current which flows through coil 53 is just sufficient to react with the magnetic field of magnets 49 and 50 in overcoming any gravity induced displacement of elements 44 and 46 to return these parts to their center position regardless of the inclination of axis OY with respect to the vertical. When axis OY is in the FIG. 3 horizontal position, there is no tendency for gravity displacement of elements 44 and 46 in either direction along axis OY, and consequently no feedback current is fed to coil 53 by servo 52. If, however, the probe is turned to a position in which axis OY is no longer directly horizontal the pickoff element 51 senses the resultant displacement of elements 44 and 46 along axis OY, to cause servo 52 to produce a current in coil 53 just counteracting the effect of gravity and returning these parts to their centered positions. An output signal is taken from the accelerometer assembly through two output lines 55 across a resistor 56, with the result that this signal, which has a predetermined known value when OY is vertical and changes from positive to negative at 90° to the vertical, constitutes the desired analog representation of the angularity of the accelerometer axis OY with respect to the vertical. It will of course be apparent that the mounting portion 148 of element 46, as well as the magnets 49 and 50, and pickoff unit 51, are all mounted in fixed positions relative to case 30 of the probe, as by rigid attachment of these parts to a rigid support 47, combined with rigid attachment of that support to the case.

The output signals a, b, and c from accelerometers 38, 39, and 40 are fed to a multiplexing circuit 57 (FIG. 5), through three separate lines 58, 59, and 60 respectively. Each of these lines may include a resistor-capacitor network represented at 61, which provides a low pass filter for smoothing out any variations produced by vibration of the probe. As will be discussed in greater detail at a later point, the multiplexing circuit 57 may include a solid state switching unit 62 containing a series of FET (Field Effect Transistor) switches, for periodically sampling the signal voltages on lines 58, 59, and 60, and on three additional lines 63, 64, and 65 from the previously mentioned magnetic units 41, 42, and 43, to encode these signals for transmission by telemetry to the surface of the earth on wireline 12.

Figure 4:
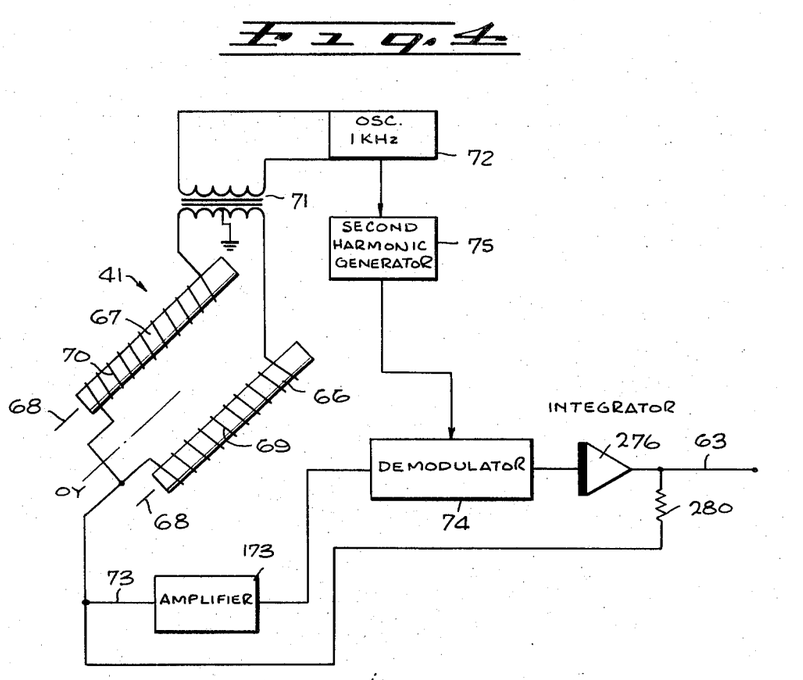
FIG. 4 illustrates diagrammatically one of the fluxgate assemblies of the probe.

The three units 41, 42, and 43 for responding to components of the earth's magnetic field preferably take the form of fluxgates, which are of known type, and one of which is illustrated generally in FIG. 4. As seen in that figure, each of the fluxgate units may include two parallel identical rods 66 and 67, formed of a saturable magnetic material, desirably mumetal, which rods are mounted in fixed positions relative to the probe case 30, With the longitudinal axes 68 of the rods being parallel to the associated one of the discussed instrument fixed axes OY, OX or OZ (illustrated as OY in FIG. 4). Two insulated coils 69 and 70 are wound about the rods 66 and 67, and are connected in series but in opposition to one another in a circuit which is energized by the secondary of a transformer 71 whose primary is connected to the output of an oscillator 72, supplying a relatively high frequency alternating current to the transformer and coils. This oscillator may as an example operate at a frequency of 1 kilohertz. The center of the secondary coil of transformer 71 may be grounded as shown, and an output signal may be taken from the point between coils 69 and 70 through a line 73. The rods 66 and 67 are designed to become saturated with magnetic flux twice on each cycle of the alternating current. However, since the two cores are connected in magnetic opposition, the earth's magnetic field component along the fluxgate axis will add to the coil induced magnetic field in one core 66 or 67 while subtracting from the coil induced field in the other core, with the condition being reversed on each reversal of the direction of the alternating current. Thus on each half cycle of the alternating current, one core 66 or 67 becomes saturated before the other, and remains saturated after the other. An output signal appears on line 73 only during periods when one but not both of the cores 66 or 67 is saturated. During those periods, the difference in reactance of the two coils causes an imbalance in the voltage developed across each coil and a resultant signal current flows through line 73. Since the portion of each cycle during which only one core is saturated is directly dependent upon the strength of the earth's magnetic field component along the corresponding axis OY, OX or OZ, the width of the output pulses on line 73 is a function of the specified magnetic field component. The applied voltage may be selected to drive the cores to saturation at about one-half the peak voltage attained on each half cycle. It will also be apparent that the apparatus may be designed to respond to desaturation of the cores rather than saturation if desired.

The second harmonic of the signal on line 73 may be amplified by an amplifier 173, and then be fed to a phase-sensitive demodulator 74 supplied with a second harmonic reference voltage from a second harmonic generator 75 energized by a reference voltage derived from oscillator 72. The output voltage from the demodulator 74 is in turn fed to an integrator 276. This integrator acts to create a D.C. current which divides between the two flux gate coils 69 and 70 and thereby creates a magnetic field about each of the mumetal rods 66 and 67. This field opposes the component of the earth's field parallel to the mumetal rods. The action of this feedback loop is such that the output signal of the phase sensitive demodulator is driven to virtually zero volts D.C. When this servoing action has stabilized, the output voltage from the flux gates at line 73 will indicate virtually zero output signal. The D.C. current output of the integrator which flows through the fluxgates is an analog of the magnetic field parallel to the mumetal rods. This current is converted to a D.C. voltage via resistor 280, the current sensing resistor.

Figure 5:
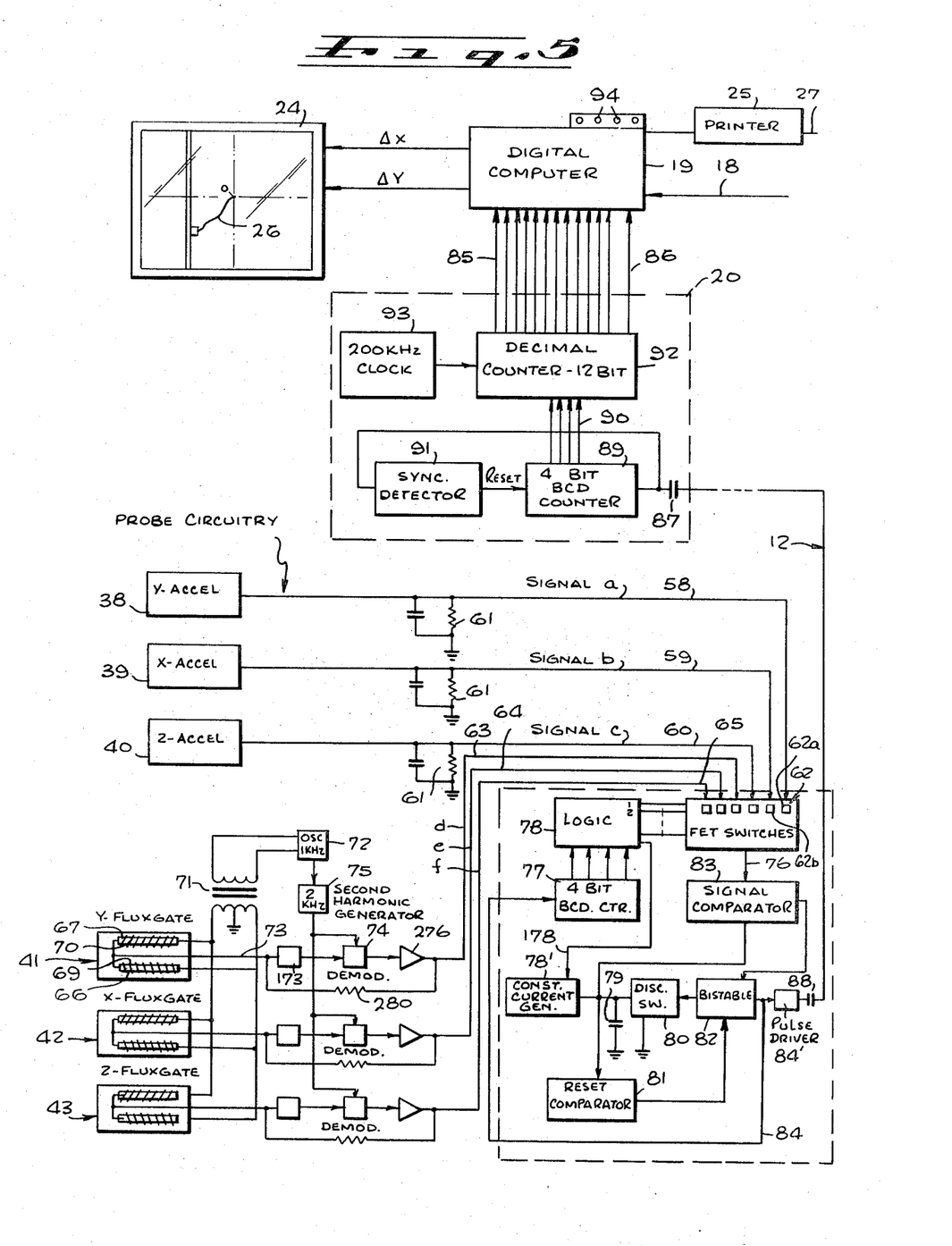
FIG. 5 is a block diagram representation of the circuitry of the apparatus.

As seen in FIG. 5, the three D.C. voltage signals $d$, $e$, and $f$ from the three integrators controlled by fluxgates 41, 42, and 43 respectively are delivered from their respective demodulators to the three lines 63, 64, and 65, as analog voltage signals representing the intensities of the earth's magnetic field components along axes OY, OX, and OZ respectively. These analog signals are conducted by lines 63, 64, and 65 to the input side of FET switch assembly 62.

The multiplexing circuit 57 functions to transmit a series of signals sequentially through wireline 12 to the surface of the earth, representing the previously discussed voltage signals $a$, $b$, $c$, $d$, $e$, and $f$ on lines 58, 59, 60, 63, 64, and 65 respectively. For this purpose, the solid state switch assembly 62 includes a series of FET switches 62a, 62b, etc., or other switches, for sequentially connecting lines 58, 59, 60, 63, 64, and 65 to a line 76 (FIG. 5), under the control of a four bit BCD (binary coded decimal) counter 77 whose outputs act through a logic circuit 78 to close the various FET switches in a predetermined repeating sequence. During each interval when one of the FET switches is closed, the voltage on the corresponding line 58, 59, 60, 63, 64, or 65 is utilized to control the amount of time which elapses between two successive pulses on wireline 12, by determining the time required for a constant current generator 78 to charge the upper side of a capacitor 79 from an initially low negative value to the value of the voltage on the particular FET switch being read out. For this purpose, when each FET switch is closed, the upper side of the capacitor may be initially shorted or returned to, say, a minus 6 volt potential, by instantaneous closure of a discharge switch 80, which then immediately reopens to allow the constant current generator 78 to commence recharging of the capacitor. When the charge at the upper side of the capacitor reaches a certain predetermined level which is still negative but not as much so as the initial discharge voltage, say for example when the capacitor charge reaches the minus 4 volt level, a first comparator 81 is automatically actuated to turn on a controlled bistable output circuit 82, which remains on until a second comparator 83 senses that the capacitor has reached a charge level corresponding to the voltage of the signal in line 76 from the FET switch, and actuates bistable circuit or flip-flop 82 to its off condition. When thus turned off, the bistable switch actuates discharge switch 80, instantaneously, to discharge capacitor 79 again and commence another cycle of operation. Also, the actuation of bistable circuit 82 to its off condition acts through control line 84 to advance BCD counter 77 to the next successive count, which acts through logic 78 to open the particular FET switch which had previously been closed and to close the next successive FET switch. A pulse driver circuit 84' is controlled by bistable circuit 82 and acts to produce an output pulse in wireline 12 each time that the bistable circuit is switched off. This pulse is very short in duration, and terminates well before the reset comparator 81 is actuated on the next successive cycle, so that the timing between successive pulses on wireline 12 represents accurately in analog fashion the voltage of the particular signal $a$, $b$, $c$, $d$, $e$, or $f$ which controlled that timing. The signals are thus fed to the surface of the earth sequentially in a multiplexed pulse time modulated stream, for decoding from that multiplexed condition before delivery to the surface computer.

The various successive multiplexed signals on wireline 12 are identified and distinguished from one another by provision of suitable sync signals in conjunction therewith, preferably consisting of an extended length delay interval between two successive pulses at the end of each series of information signals $a$, $b$, $c$, $d$, $e$, and $f$, which delay is longer than any possible interval representing one of the information signals and can therefore be readily distinguished therefrom. For this purpose, the constant current generator 78' has a reduced current rate (say one-third of its normal current) to which it is switched by logic 78 through energization of a control line 178 after all of the FET switches have been scanned successively, to thereby charge capacitor 79 at a very slow rate requiring a relatively long period of time before actuation of comparator 83 and thus produce the desired long synchronizing signal represented by two widely spaced pulses on the wireline. The next actuation of counter 77 after this synchronizing signal causes logic 78 to again close the first of the FET switches and to thus commence formation of another series of pulse time modulated signals on the wireline. It will of course be understood that all of the circuitry just described for delivering the multiplexed signals to wireline 12 is contained within the probe case 30.

The pulse time modulated or otherwise multiplexed signals on wireline 12 are decoded at the surface of the earth by the data converter or demultiplexing circuit designated generally by the number 20 in FIGS. 1 and 5. This circuit is desirably of a type acting to convert the sequential signals on the wireline to a series of identifiable binary coded decimal (BCD) signals delivered to computer 19 on twelve computer input lines 85 and an associated identification line 86. The wireline 12 may be connected to the demultiplexing circuit 20 through a capacitor 87, and be similarly connected to the probe circuitry through a capacitor 88.

In FIG. 5, the demultiplexing circuitry is typically illustrated as including a four bit BCD counter 89 which receives the pulse time modulated signals from the wireline, and is advanced through successive binary counts on its four output lines 90 by the successive pulses. A sync detector 91 responds to the relatively extended sync interval in the pulse time modulated series of signals to reset counter 89 to a zero position when the sync signal is received. The length of time that counter 89 remains in each of its various count conditions is measured by a decimal counter 92, driven by a high frequency clock or oscillator 93, typically having a frequency of 200 kilo-hertz. Thus, the binary coded decimal count on the twelve output lines 85 of counter 92 represents the length of a corresponding signal interval between successive pulses on wireline 12, and therefore represents the value of a corresponding one of the downhole signals $a$, $b$, $c$, $d$, $e$, or $f$. Counts representing these signals are successively fed to the computer, in conjunction with identification signals on a line 86 keyed to the sync signal on the wireline and serving to identify to the computer which of the downhole signals is represented by each of the various computer input counts.

The computer 19 may be a conventional general purpose digital computer which is programmed to make a series of predetermined computations and deliver a series of predetermined output signals to plotter 24 and printer 25 at each of a series of uniformly spaced stations along the length of the well. For example, a first of these series of programmed computations may be formed when probe 10 is at the surface of the earth, with the next series of computations being performed when the probe is at a station 100 feet down the hole, and with subsequent computations being performed at other stations similarly spaced 100 feet apart longitudinally of the hole. As the probe is lowered into the hole, odometer 17 measures the length of wireline which is advanced into the well, and sends a signal through line 18 to computer 19 upon arrival of the probe at each of the predetermined uniformly spaced stations, in response to which the computer commences its series of programmed calculations. In a preferred arrangement, the computer makes appropriate calculations to actuate the printer to print successively on the strip of tape, for each of the various stations, the following information:

1. The Station Number (typically written as the letter 'S' followed by the 1, 2, 3, etc. e.g., S-1).
2. The drift angle (D) of the well and the probe at that particular station (i.e., the angle D of FIG. 1 between the axis of the probe and the true vertical).
3. The Azimuth (A) of the well bore and probe at that station (i.e., the compass direction, in degrees, toward which the probe and well bore are inclined at the station).
4. The measured depth (P) of the probe at the station (derived directly from odometer 17),
5. The vertical depth (V) or vertical departure of the probe from its initial location at the surface of the earth.
6. The North-South departure (N or S) of the probe and well bore from the point at which the hole commenced at the surface of the earth.
7. The East-West departure (E or W) of the probe and well bore from the point at which the well commenced at the surface of the earth.
8. The average hole curvature (K) between two successive stations, in degrees per 100 feet, (referred to as "dog-leg severity").

As an example, the above information may be printed out for a particular station on tape 27 as follows:

S 012 . . . (Station 12)
D 90.22 . . . (Drift angle, 90.22°)
A 251.97 . . . (Azimuth, 251.97°)
P 1200.00 . . . (Measured depth, 1200 feet)
V 723.47 . . . (Vertical depth, 723.47 feet)
S 494.26 . . . (Southerly departure, 494.26 feet)
W 467.10 . . . (Westerly departure, 467.10 feet)
K 3.26 . . . (Hole curvature, 3.26° per 100 feet)
S 013 . . . (Station 13).
- - - - etc.

Figure 7:
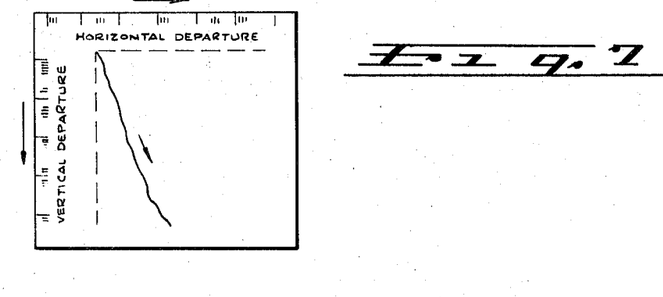
FIG. 7 shows an elevation graph made by the x-y plotter.

Immediately upon arrival of probe 10 at each of the selected stations, odometer 17 automatically causes the computer to initiate and substantially instantaneously complete a series of calculations for determining all of the above specified information for that particular station. The computer in turn actuates the printer to immediately print out that information in the manner discussed, and causes the $x$–$y$ plotter 24 to plot, instantaneously upon arrival of the probe at each station, the advancement of the well hole and probe to that station from the preceding one. Thus, a continual up-to-date plot of the well is maintained in real time. The computer may be programmed to produce selectively any one of two or more types of graphs, preferably including either a plan view in which the North-South and East-West departure of the hole are plotted progressively against each other as illustrated on the graph 26 of FIGS. 1 and 5, or an elevation graph as seen in FIG. 7, in which horizontal departure is plotted against vertical depth to give a vertical profile of the hole. The computer may be actuated between its different conditons by a number of push buttons 94 (FIG. 1), including at least four such buttons labelled "PLAN", "ELEVATION", "RESET/PRINT" and "HOLD". The "PLAN" button when pressed instructs the computer to produce a FIG. 5 type plan view graph on the plotter, desirably accompanied by a simultaneous print out by printer 25 of the above discussed information which it records. The "ELEVATION" button instructs the computer to produce a FIG. 7 type graph and a print out. The "RESET/PRINT" button resets the plan and elevation operations to a zero condition, and typically also instructs the computer and printer to produce a single print out of the current drift and azimuth angles. The "HOLD" button temporarily halts all operation of the computer and related circuitry at a particular condition.

To discuss the mathematics involved in the functioning of the present apparatus, and the programming of the computer, to an extent assuring a full understanding of the invention by persons skilled in the art, it may first of all be noted that the three output signals $a$, $b$, and $c$ from accelerometers 38, 39, and 40 respectively, representing three inclination components, may be defined as follows:

$a = -g \sin D \cos H$
$b = g \sin D \sin H$
$c = g \cos D$ where:

$g$ is the Gravitational Constant scale factor
$D$ is the Drift Angle of the hole and probe as defined hereinabove
$H$ is the 'High Side Angle,' that is, the angle through which probe 10 is turned about its longitudinal axis 31 from an orientation in which a predetermined reference point on the outer surface of the inclined probe is at its "high side".

To discuss this "High Side Angle" H more specifically, it is convenient to treat as the "reference point" for this purpose the location at which T-slot 33 of FIG. 2 enters the periphery of probe case 30, or more specifically the center of the T-slot opening (point R in FIG. 2). The "High Side Angle" may then be considered as having a value of zero degrees when the inclined probe is turned about its longitudinal axis 31 to a position in which this T-slot reference location R is at the "High Side" of the probe, that is, the position in which point R is higher than in any other position to which the probe can be turned about its axis. In FIG. 1, this would mean that the T-slot would be at the location designated 33', at the left side of the probe. If the probe is in fact not in this position, the above referred to High Side Angle is the angle (in degrees) through which the reference point R is turned in a clockwise direction from the zero position (as viewed looking down the hole along axis 31).

The three directional component signals $d$, $e$, and $f$ produced by fluxgates 41, 42, and 43 respectively may be defined as follows:

$d = -M$ (cos A cos B cos D cos H $-$ sin A cos B sin H $-$ sin B sin D cos H)

$e = M$ (cos A cos B cos D sin H $+$ sin A cos B cos H $-$ sin B sin D sin H)

$f = -M$ (sin B cos D $+$ cos A cos B sin D)

where:
$M$ is the magnetic constant (scale factor)
$A$ is the Azimuth Angle,
$B$ is the Magnetic Dip Angle,
$D$ is the Drift Angle, and
$H$ is the High Side Angle.

The computer is preferably programmed to calculate the drift angle D at each station in accordance with the following formula:

$$D = \tan^{-1} \sqrt{a^2 + b^2}/c \tag{7}$$

where:
$0° \leq D \leq 180°$
$D = 0°$ when numerator $= 0$ and denominator $> 0$
$D = 180°$ when numerator $= 0$ and denominator $< 0$
$D = 90°$ when denominator $= 0$
$0° < D < 90°$ when denominator $> 0$
$90° < D < 180°$ when denominator $< 0$
$D$ is measured from vertical with $D = 0°$ when probe is pointing straight down
$a, b, c$ are the values of the drift component signals on lines 58, 59 and 60 of FIG. 5.

To compute the azimuth A, as above defined, the computer is preferably programmed in accordance with the following formula, with the below stated limitations:

$$A = \tan^{-1} (ae\ 31\ bd)\ \sqrt{a^2 + b^2 + c^2}/(a^2 + b^2)f - (ad + be)c \tag{8}$$

where:
$0° \leq A < 360°$
$a, b, c, d, e$ and $f$ are the signal values on lines 58, 59, 60, 63, 64 and 65
$A = 0°$ when numerator $= 0$ and denominator $< 0$
$A = 180°$ when numerator $= 0$ and denominator $> 0$
$A = 90°$ when denominator $= 0$ and numerator $< 0$
$A = 270°$ when denominator $= 0$ and numerator $> 0$
$0° < A < 90°$ when numerator $< 0$ and denominator $< 0$
$90° < A < 180°$ when numerator $< 0$ and denominator $> 0$
$180° < A < 270°$ when numerator $> 0$ and denominator $> 0$
$270° < A < 360°$ when numerator $> 0$ and denominator $< 0$
$A$ is measured from magnetic north clockwise with $A = 0°$ when probe is pointing toward magnetic north.

The incremental horizontal and vertical departures or coordinates between two successive stations in the well, having drift angles $D_1$ and $D_2$ respectively, and azimuths $A_1$ and $A_2$ respectively, may be determined by the following formulae:

$\Delta Z$ (Vertical Increment) $= 100 \cos(D_1 + D_2/2$ \hfill (9)

$\Delta Z > 0$ if $0° \leq D_1 + D_2/2 < 90°$
$\Delta Z < 0$ if $90° < D_1 + D_2/2 \leq 180°$
$\Delta Z = 0$ if $D_1 + D_2/2 = 90°$ $\Delta X$ (East-West Increment) $= 100 \sin(D_1 + D_2/2)\sin(A_1 + A_2/2)$ \hfill (10)

if $|A_1 - A_2| > 180°$, use $100 \sin(D_1 + D_2/2)\sin(A_1 + A_2 + 360°/2)$
if $|A_1 - A_2| < 180°$, use $100 \sin(D_1 + D_2/2)\sin(A_1 + A_2/2)$
if $|A_1 - A_2| = 180°$, set $\Delta X = 0$
$\Delta X > 0$ if $0° < A_1 + A_2/2 < 180°$
or $0° < A_1 + A_2 + 360°/2 < 180°$
$\Delta X < 0$ if $180° < A_1 + A_2/2 < 360°$
or $180° < A_1 + A_2 + 360°/2 < 360°$
$\Delta X = 0$ if $A_1 + A_2/2 = 180°$
or $A_1 + A_2 + 360°/2 = 0°$ $\Delta Y$ (North-South Increment) $= 100 \sin(D_1 + D_2/2)\cos(A_1 + A_2/2)$ \hfill (11)

if $|A_1 - A_2| > 180°$, use $100 \sin(D_1 + D_2/2)\cos(A_1 + A_2 + 360°/2)$
if $|A_1 - A_2| < 180°$, use $100 \sin(D_1 + D_2/2)\cos(A_1 + A_2/2)$
if $|A_1 - A_2| = 180°$ set $\Delta Y = 0$ $\Delta Y > 0$ if $0° \leq A_1 + A_2/2 < 90°$
or $270° < A_1 + A_2/2 \leq 360°$
or $0° \leq A_1 + A_2 + 360°/2 < 90°$
or $270° < A_1 + A_2 + 360°/2 \leq 360°$ $\Delta Y < 0$ if $90° < A_1 + A_2/2 < 270°$ $\Delta Y = 0$ if $A_1 + A_2/2 = 90°$ or $270°$ The computer calculates these departure increments according to the specified above formulae at each station, and maintains in its memory a running total of these increments as a total vertical departure or depth, and total East-West and North-South departures, as follows:

$$Z_t(\text{Vertical Total}) = \sum_{i=1}^{100} \Delta Z_i \tag{12}$$

$$X_t(\text{East-West Total}) = \sum_{i=1}^{100} \Delta X_i \tag{13}$$

$$Y_t(\text{North-South Total}) = \sum_{i=1}^{100} \Delta Y_i \tag{14}$$

These total departures are printed out at each station on the printed tape 27, as discussed previously, and the incremental departures are fed to the X-Y plotter 24 to produce either or both of the two previously discussed types of graphs. It is also contemplated that the computer may store in its memory all of the incremental information for the various stations during a probe lowering operation, with one type of graph being produced by the plotter automatically in real time as the probe is lowered, and with the computer being actuable by one of the pushbuttons 94 after the lowering operation to actuate the plotter to rapidly form from its memory information the other type of graph.

The hole curvature K is calculated by the computer according to the following formula: $K = \cos^{-1} [\cos D_1 \cos D_2 + \sin D_1 \sin D_2 \cos (A_2 - A_1)]$     (15)
$K$ always $< 90°$
if $|A_2 - A_1| > 180°$, use:
    $\cos^{-1} [\cos D_1 \cos D_2 + \sin D_1 \sin D_2 \cos (360° - |A_2 - A_1|)]$
if $|A_2 - A_1| < 180°$, use:
    $\cos^{-1} [\cos D_1 \cos D_2 + \sin D_1 \sin D_2 \cos (A_2 - A_1)]$
if $|A_2 - A_1| = \frac{1}{2}°$, use:
    $\cos^{-1} [\cos D_1 \cos D_2 - \sin D_1 \sin D_2]$ While a certain specific embodiment of the invention has been disclosed as typical, the invention is of course not limited to this particular form, but rather is applicable broadly to all such variations as fall within the scope of the appended claims. As an example, it is contemplated that a gyro or gyros may be substituted for the magnetically responsive fluxgates of the probe, to produce directional signals referenced to the true North rather than magnetic North, or referenced to any other appropriate and convenient gyro determined direction. Also, the instrument may in some instances be contained within a drill string at a set location near the drill, and be lowered with the string into a well. In that case, the string may have an appropriately non-magnetic section about the probe if the discussed magnetic type sensors are employed, to enable the desired response to the earth's magnetic field. Similarly, many of numerous other variations of the specifically disclosed equipment can be provided.

We claim:

1. Well surveying apparatus comprising a probe to be lowered into a well and including first sensing means for sensing the angularity of the probe with respect to the vertical, and second sensing means for sensing the orientation of the probe with respect to a predetermined direction other than the vertical, said first sensing means including three mutually perpendicular gravity actuated sensors for sensing three different conponents respectively of the probe inclination; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well.

2. Well surveying apparatus as recited in claim 1, including means responsive to said computer means to display said one coordinate or information derived therefrom.

3. Well surveying apparatus as recited in claim 1, including printer means responsive to said computer means to produce a record of said one coordinate at different stations in the well.

4. Well surveying apparatus as recited in claim 1, including plotter means responsive to said computer means to plot a graph representing the directional advancement of said well into the earth and based at least partially on said one coordinate.

5. Well surveying apparatus as recited in claim 1, in which said computer means are programmed to compute both the North-South horizontal departure coordinate and the East-West horizontal departure coordinate between said two different stations.

6. Well surveying apparatus as recited in claim 1, in which said computer means are programmed to compute the vertical coordinate between said two stations.

7. Well surveying apparatus as recited in claim 1, in which said computer means are programmed to compute, as three of said coordinates, the North-South departure, the East-West departure, and the vertical coordinate between said two stations.

8. Well surveying apparatus as recited in claim 1, in which said computer means are programmed to maintain a running total of a series of coordinates computed for a series of successive stations, to indicate a total horizontal or vertical coordinate between the beginning and end of said series of stations.

9. Well surveying apparatus as recited in claim 1, in which said second sensing means include means responsive to changes in the directional orientation of said probe with respect to a North-South reference axis.

10. Well surveying apparatus as recited in claim 1, in which said computer means are programmed to compute both the North-South horizontal departure coordinate and the East-West horizontal departure coordinate between said two stations, there being plotter means responsive to said computer means to plot a plan view graph of the well having North-South departures plotted against East-West departures.

11. Well surveying apparatus as recited in claim 1, in which said computer means are programmed to compute the vertical coordinate between said two stations, there being plotter means responsive to said computer means to plot an elevational representation of the well in which horizontal drift of the well is plotted against vertical depth.

12. Well surveying apparatus as recited in claim 1, in which said computer is programmed to calculate the drift angle D of said probe at a particular station according to the formula:

$$D = \tan^{-1} \sqrt{a^2 + b^2}/c$$

where $a$, $b$ and $c$ are component signals from said three sensors respectively.

13. Well surveying apparatus comprising a probe to be lowered into a well and including first sensing means for sensing the angularity of the probe with respect to the vertical, and second sensing means for sensing the orientation of the probe with respect to a predetermined direction other than the vertical; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well; said first sensing means including three mutually perpendicular gravity actuated sensors; said second sensing means including three mutually perpendicular sensors responsive to changes in the orientation of said probe with respect to a North-South axis; said computer means being programmed to compute, as three of said coordinates, the North-South departure, the East-West departure, and the vertical distance, between said two stations.

14. Well surveying apparatus comprising a probe to be lowered into a well and including first sensing means for sensing the angularity of the probe with respect to the vertical, and second sensing means for sensing the orientation of the probe with respect to a predetermined direction other than the vertical; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well, said first sensing means including three gravity actuated sensors having mutually perpendicular axes and producing three output signals $a$, $b$, and $c$; said second sensing means including three mutually perpendicular compass direction responsive sensors producing three output signals $d$, $e$, and $f$; said computer means being connected to receive said signals $a$, $b$, $c$, $d$, $e$, and $f$ and being programmed to calculate therefrom the drift angularity of said probe with respect to the vertical, and the azimuth A of said drift according to the formula:

$$A = \tan^{-1} (ae - bd) \sqrt{a^2 + b^2 + c^2}/(a^2 + b^2) f - (ad + be) c$$

15. Well surveying apparatus as recited in claim 14, in which said computer means are programmed to compute two horizontal departure coordinates and one vertical coordinate between said two stations, according to the formulae:

North-South departure = $100 \sin(D_1 + D_2/2)\cos(A_1 + A_2/2)$ where $D_1$ and $D_2$ are the drift angles at said two stations, and are computed from said sensor signals; $A_1$ and $A_2$ are the azimuths at said two stations and are computed from said sensor signals; and $A_1 + A_2 + 360°$ is substituted for $A_1 + A_2$ when $|A_1 - A_2|$ is greater than 180°

East-West departure = $100 \sin(D_1 + D_2/2)\sin(A_1 + A_2/2)$ where $A_1 + A_2 + 360°$ is substitued for $A_1 + A_2$ when $|A_1 - A_2|$ is greater than 180°

Vertical coordinate = $100 \cos (D_1 + D_2/2)$

16. Well surveying apparatus comprising a probe to be lowered into a well and including first sensing means for sensing the angularity of the probe with respect to the vertical, and second sensing means for sensing the orientation of the probe with respect to a predetermined direction other than the vertical; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well, said first sensing means including three mutually perpendicular gravity actuated sensors producing three output signals; said second sensing means including three mutually perpendicular compass direction responsive sensors producing three output signals; said computer means being connected to receive said signals and being programmed to calculate therefrom the drift angularity of said probe with respect to the vertical, and the azimuth of said drift, and to compute from the drift angularity and azimuth the North-South departure, the East-West departure, and the vertical coordinate between said two stations.

17. Well surveying apparatus as recited in claim 16, including plotter means responsive to said computer means to plot selectively either a plan view or an elevational representation of the well.

18. Well surveying apparatus comprising a probe to be lowered into a well and including first sensing means for sensing the angularity of the probe with respect to the vertical, and second sensing means for sensing the orientation of the probe with respect to a predetermined direction other than the vertical; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well; said first sensing means including three mutually perpendicular gravity actuated sensors producing three output signals $a$, $b$, and $c$; said second sensing means including three mutually perpendicular compass direction responsive sensors producing three output signals $d$, $e$, and $f$; said computer means being connected to receive said signals and being programmed to calculate therefrom the drift angularity D of said probe and the azimuth A of the drift, and to calculate the North-South departure, East-West departure, and vertical coordinate between two stations according to the formulae:

North-South departure = $100 \sin (D_1 + D_2/2)\cos(A_1 + A_2/2)$ where $D_1$ and $D_2$ are the drift angles at said two stations;

$A_1$ and $A_2$ are the azimuths at said two stations; and $A_1 + A_2 + 360°$ is substituted for $A_1 + A_2$ when $|A_1 - A_2|$ is greater than 180°

East-West departure = $100 \sin(D_1 + D_2/2)\sin(A_1 + A_2/2)$ where $A_1 + A_2 + 360°$ is substituted for $A_1 + A_2$ when $|A_1 - A_2|$ is greater than 180°

Vertical coordinate = $100 \cos(D_1 + D_2/2)$

19. Apparatus comprising a probe adapted to be lowered into a well and including sensing means responsive to changes in inclination of said probe, computer means responsive to said sensing means and programmed to compute the azimuth direction in which said probe is inclined relative to the vertical, and means for displaying said azimuth direction, said sensing means including three mutually perpendicular gravity actuated sensors producing outputs, $a$, $b$, and $c$, and three mutually perpendicular compass direction responsive sensors producing outputs $d$, $e$, and $f$, said computer means being programmed to calculate said azimuth direction according to the formula:

$$A \text{ (azimuth direction)} = \tan^{-1} (ae - bd) \sqrt{a^2 + b^2 + c^2}/(a^2 + b^2) f - (ad + be) c$$

20. Well surveying apparatus comprising a probe to be lowered into a well and including first sensing means for sensing the angularity of the probe with respect to the vertical, and second sensing means for sensing the orientation of the probe with respect to a predetermined direction other than the vertical, said first sensing means including a plurality of gravity actuated sensors for sensing different components respectively of the probe inclination; means for measuring movement of said probe between different stations longitudinally of the well; and computer means connected to receive signals from said first and second sensing means representing the orientation of the probe in the well, and to receive additional signals from said measuring means representing distances between different stations longitudinally of the well, and programmed to compute from said signals at least one horizontal or vertical coordinate between two different stations in the well.

* * * * *